(12) United States Patent
Inui et al.

(10) Patent No.: US 11,439,942 B2
(45) Date of Patent: Sep. 13, 2022

(54) GAS PURIFICATION APPARATUS, SHIP INCLUDING THE SAME, AND GAS PURIFICATION METHOD

(71) Applicant: Mitsubishi Heavy Industries Engineering, Ltd., Kanagawa (JP)

(72) Inventors: Masayuki Inui, Kanagawa (JP); Makoto Susaki, Kanagawa (JP); Akihito Otani, Kanagawa (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 0 days.

(21) Appl. No.: 17/273,472

(22) PCT Filed: Sep. 5, 2019

(86) PCT No.: PCT/JP2019/034962
§ 371 (c)(1),
(2) Date: Mar. 4, 2021

(87) PCT Pub. No.: WO2020/084925
PCT Pub. Date: Apr. 30, 2020

(65) Prior Publication Data
US 2021/0245084 A1    Aug. 12, 2021

(30) Foreign Application Priority Data

Oct. 24, 2018  (JP) .............................. JP2018-199676

(51) Int. Cl.
*B01D 46/00*    (2022.01)
*B01D 46/24*    (2006.01)
(Continued)

(52) U.S. Cl.
CPC ......... *B01D 46/2403* (2013.01); *B01D 46/66* (2022.01); *B01D 53/9431* (2013.01);
(Continued)

(58) Field of Classification Search
CPC .......... B01D 46/0036; B01D 2257/302; B01D 2251/404; B01D 53/83; B01D 2253/112;
(Continued)

(56) References Cited

U.S. PATENT DOCUMENTS 4,260,399 A * 4/1981 Kawasaki .......... B01D 46/0036
96/373
5,288,299 A * 2/1994 Yoshida ................. B01D 46/70
55/528
(Continued)

FOREIGN PATENT DOCUMENTS

JP    S55-137027 A    10/1980
JP    S57-107226 A    7/1982
(Continued)

OTHER PUBLICATIONS

International Search Report of PCT/JP2019/034962 dated Nov. 26, 2019 (14 pages).
(Continued)

*Primary Examiner* — Timothy C Vanoy
(74) *Attorney, Agent, or Firm* — Osha Bergman Watanabe & Burton LLP (57) ABSTRACT

A gas purification apparatus includes: a housing to which a gas is introduced; a filter portion for removing an impure substance in the gas from the gas, the filter portion being disposed inside the housing; and a gas purification agent for removing a removal target substance in the gas from the gas, the gas purification agent being disposed, inside the housing, on the filter portion or in a space at a downstream side of the filter portion with respect to a flow of the gas.

13 Claims, 6 Drawing Sheets

(51) Int. Cl.
   *B01D 53/94* (2006.01)
   *B01J 35/06* (2006.01)
   *B63H 21/32* (2006.01)
   *F01N 3/035* (2006.01)
   *B01D 46/66* (2022.01)

(52) U.S. Cl.
   CPC .............. *B01J 35/06* (2013.01); *B63H 21/32* (2013.01); *F01N 3/035* (2013.01); *B01D 2255/9155* (2013.01); *B01D 2279/30* (2013.01); *B01D 2279/40* (2013.01); *F01N 2250/02* (2013.01); *F01N 2330/00* (2013.01)

(58) Field of Classification Search
   CPC ............ B01D 46/2403; B01D 2279/30; B01D 53/62; B01D 2259/4566; B01D 53/9431; B01D 2251/604; B01D 2255/9155; B01D 2251/606; B01D 2257/504; B01D 46/66; B01D 2253/102; B01D 2251/304; B01D 2279/40; B01D 2258/01; B01D 53/508; F01N 3/021; F01N 2570/14; F01N 2330/00; F01N 13/00; F01N 3/035; F01N 2250/02; F01N 2570/04; F01N 2590/02; B01J 35/06; B63H 21/32; Y02C 20/40
   See application file for complete search history.

(56) References Cited

U.S. PATENT DOCUMENTS

| | | | | |
|---|---|---|---|---|
| 5,505,766 | A * | 4/1996 | Chang | B01D 53/81 95/134 |
| 7,442,352 | B2 * | 10/2008 | Lu | B01D 53/02 423/393 |
| 7,494,632 | B1 * | 2/2009 | Klunder | F23J 15/003 95/134 |
| 7,658,897 | B2 * | 2/2010 | Fleischanderl | B01D 53/508 423/210 |
| 7,666,374 | B2 * | 2/2010 | Grochowski | B01D 53/08 423/244.01 |
| 2003/0019356 | A1 * | 1/2003 | Herden | F23J 15/006 96/150 |
| 2008/0286166 | A1 * | 11/2008 | Heidenreich | B01D 46/2403 422/177 |
| 2009/0263303 | A1 * | 10/2009 | Fokema | B01J 23/002 423/245.3 |
| 2011/0197760 | A1 * | 8/2011 | Lindau | B01D 53/0454 96/111 |
| 2018/0008963 | A1 * | 1/2018 | Castellino | B01J 37/0215 |
| 2018/0008965 | A1 * | 1/2018 | Thøgersen | B01D 53/865 |
| 2018/0353948 | A1 * | 12/2018 | Kollin | B01J 37/0236 |

FOREIGN PATENT DOCUMENTS

| | | |
|---|---|---|
| JP | H05-329316 A | 12/1993 |
| JP | H06-165916 A | 6/1994 |
| JP | H07-204434 A | 8/1995 |
| JP | H07-204466 A | 8/1995 |
| JP | H09-000842 A | 1/1997 |
| JP | 3057878 U | 6/1999 |
| JP | 2003-126654 A | 5/2003 |
| JP | 2015-047519 A | 3/2015 |
| KR | 101823897 B1 | 3/2018 |

OTHER PUBLICATIONS

International Preliminary Report on Patentability dated May 6, 2021 in corresponding International (PCT) Application No. PCT/JP2019/034962 (27 pages).

* cited by examiner

GAS PURIFICATION APPARATUS, SHIP INCLUDING THE SAME, AND GAS PURIFICATION METHOD

TECHNICAL FIELD

The present disclosure relates to a gas purification apparatus, a ship including the same, and a gas purification method.

BACKGROUND ART

As a gas purification apparatus for removing sulfur oxide (SOx), nitrogen oxide (NOx), or carbon dioxide ($CO_2$) contained in exhaust gas from a combustion facility or the like of an engine or the like, a dry-type gas purification apparatus using a solid gas purification agent may be used.

For instance, Patent Document 1 discloses a dry-type desulfurization apparatus for removing sulfur oxide or the like from exhaust gas from a furnace. The dry-type desulfurization apparatus is configured to inject a desulfurization agent (slaked lime or activated coal) into a connection duct for introducing exhaust gas from the furnace into a housing, and cause the desulfurization agent to contact and make reaction with sulfur oxide in the exhaust gas, thereby removing sulfur oxide from the exhaust gas. A filter is disposed inside the housing of the dry-type desulfurization apparatus, and the desulfurization agent after reaction is collected by the filter along with soot dust in the exhaust gas. Furthermore, exhaust gas after passing the filter is discharged to the atmosphere via a stack after necessary post-treatment.

CITATION LIST

Patent Literature

Patent Document 1: JP3057878U

SUMMARY

Problems to be Solved

The gas purification apparatus (desulfurization apparatus) in Patent Document 1 is configured to collect, by using the filter, the gas purification agent (desulfurization agent) after performing a purification process (desulfurization process) of exhaust gas and impure substances (soot dust, etc.) in exhaust gas, at the same time. Thus, for instance, when the used gas purification agent is to be reused with minimum contamination from impure substances such as soot dust, the size of the apparatus can be reduced compared to a case where exhaust gas after removing dust with a filter is introduced to another housing for a gas purification process.

On the other hand, the gas purification apparatus in Patent Document 1 is configured to inject a gas purification agent into exhaust gas that contains soot dust or the like, and thus the soot dust or the like may adhere to the surface of the gas purification agent injected into the exhaust gas. Accordingly, the gas purification agent may be covered by the soot dust or the like within the exhaust gas, which may reduce the opportunity of contact between the removal target substance (sulfur oxide) in the exhaust gas and the gas purification agent, and deteriorate the reaction rate of the gas purification reaction. Furthermore, the gas purification agent collected by the filter is mixed with the impure substances such as soot dust, and thus reutilization of the gas purification agent is not easy. Furthermore, if dust removal and gas purification are carried out in separate housings, the size increase of the apparatus would be inevitable.

In view of the above, an object of at least one embodiment of the present invention is to provide a gas purification apparatus, a ship including the same, and a gas purification method, capable of making the apparatus compact while improving the efficiency of gas purification.

Solution to the Problems (1) According to at least one embodiment of the present invention, a gas purification apparatus includes: a housing to which a gas is introduced; a filter portion for removing an impure substance in the gas from the gas, the filter portion being disposed inside the housing; and a gas purification agent for removing a removal target substance in the gas from the gas, the gas purification agent being disposed, inside the housing, on the filter portion or in a space at a downstream side of the filter portion with respect to a flow of the gas.

With the above configuration (1), both the filter portion for removing impure substances (e.g. soot dust or oil) in the gas and the gas purification agent for removing a removal target substance (e.g., sulfur oxide, nitrogen oxide, or carbon dioxide) in the gas are provided in the single housing, and thus it is possible to make the gas purification apparatus more compact. Furthermore, with the above configuration (1), the gas purification agent is disposed, inside the housing, in the downstream space of the filter portion or on the filter portion, and thus it is possible to bring into contact the gas purification agent and the gas from which impure substances are removed after passing the filter. Accordingly, it is possible to suppress deterioration of the reaction rate due to contamination of the gas purification agent with impure substances. Thus, with the above configuration (1), it is possible to make the apparatus compact, and improve the efficiency of gas purification at the same time.

Furthermore, with the gas purification apparatus in Patent Document 1, the gas purification agent after reaction is collected by the filter with the impure substances in the gas, and thus the used gas purification agent is retrieved from the apparatus as a mixture with impure substances. In this regard, with the above configuration (1), the gas after removing impure substances or the like with the filter portion is brought into contact with the gas purification agent, and thus it is possible to retrieve the used gas purification agent and impure substances separated from the gas by the filter portion separately. Thus, it is possible to facilitate reutilization of a used gas purification agent.

Furthermore, the gas purification agent disposed in the downstream space of the filter portion includes the gas purification agent disposed in the hollow portion of the filter element described below, for instance. Furthermore, the gas purification agent disposed on the filter portion includes the gas purification agent supported by the filter element described below.

(2) In some embodiments, in the above configuration (1), the filter portion includes a filter element having a hollow portion, the filter element being disposed so as to protrude from the space at the downstream side toward a space at an upstream side of the filter portion with respect to the flow of the gas, and the gas purification agent is disposed at least in the filter element or in the hollow portion of the filter element.

With the above configuration (2), the filter element is disposed so as to protrude from the downstream space toward the upstream space of the filter portion, and thus it is possible to remove impure substances reliably from the gas flowing into the hollow portion via the filter element from the upstream space. Furthermore, since the gas purification agent is disposed in the hollow portion of the filter element or in the filter element (e.g. the outer surface of the inner surface of the filter element), it is possible to save the space, and further reduce the size of the gas purification apparatus.

(3) In some embodiments, in the above configuration (2), the filter element includes a tubular filter element.

With the above configuration (3), a tubular filter element is used, and thus it is possible to provide a relatively large number of filter elements inside the housing with a limited space, and improve the gas purification efficiency even further. Furthermore, the filter element has a simple tubular shape, and thus can be produced relatively easily.

(4) In some embodiments, in the above configuration (2) or (3), the filter portion further includes a support portion for supporting the filter element, the filter element protrudes downward from the support portion, and the support portion is configured to store a backup gas purification agent above the gas purification agent.

With the above configuration (4), a backup gas purification agent can be stored above the gas purification agent disposed in the hollow portion of the filter element or in the filter element protruding downward from the support portion, and thus the gas flowing into the hollow portion from the upstream space of the filter element can flow above and make contact with the backup gas purification agent. Thus, it is possible to perform a gas purification processing on the gas more effectively. Furthermore, with the above configuration (4), when the gas purification agent disposed in the hollow portion of the filter element is consumed and used, the gas purification agent disposed above can be supplied to the hollow portion by discharging the used gas purification from the hollow portion, and thus it is possible to operate the gas purification apparatus more efficiently.

(5) In some embodiments, in any one of the above configurations (2) to (4), the gas purification apparatus further includes a discharge port for discharging the gas purification agent from the hollow portion of the filter element, the discharge port being disposed on the filter element.

With the above configuration (5), it is possible to discharge the gas purification agent from the hollow portion via the discharge port disposed in the filter element, and thus it is possible to discharge the gas purification agent via the discharge port easily. Furthermore, it is possible to supply and replace the gas purification agent easily.

(6) In some embodiments, in the above configuration (5), the gas purification apparatus further includes an opening-and-closing portion configured to open and close the discharge port.

With the above configuration (6), by providing the opening-and-closing portion capable of opening and closing the discharge port, it is possible to discharge the gas purification agent from the hollow portion at a desired timing. For instance, by opening the opening-and-closing portion at the timing when the gas purification agent disposed in the hollow portion is used up, it is possible to discharge the gas purification agent from the hollow portion. Thus, it is possible to operate the gas purification apparatus more efficiently.

(7) In some embodiments, in the above configuration (5) or (6), the gas purification apparatus further includes a discharge chamber through which the gas purification agent is to be discharged from the hollow portion, and the discharge chamber and the space at the upstream side are separated.

With the above configuration (7), by separating the upstream space where impure substances separated from the exhaust gas at the filter portion remain and the discharge chamber being a space through which the used gas purification agent is discharged from the hollow portion, it is possible to suppress contamination of the discharged gas purification agent with impure substances or the like. Therefore, it is possible to retrieve the used gas purification agent in a relatively high purity, and thus it is possible to reuse the used gas purification agent.

(8) In some embodiments, in any one of the above configurations (2) to (7), the gas purification apparatus further includes a filter cleaning portion configured to blow a fluid toward the filter element, or a pre-coating portion covering the filter element.

With the above configuration (8), with the filter cleaning portion capable of blowing a fluid (e.g. cleaning gas) toward the filter element, it is possible to blow off impure substances adhering to the filter element. Thus, it is possible to suppress adherence of impure substances to the filter element and reduce pressure loss, thereby performing gas purification more efficiently.

Alternatively, with the above configuration (8), a pre-coating portion that covers the filter element is provided, and thus it is possible to suppress clogging and adherence of impure substances to the filter element effectively, and carry out gas purification efficiently.

(9) In some embodiments, in the above configuration (8), the gas purification apparatus includes the filter cleaning portion, and the filter cleaning portion includes a gas injection portion disposed outside the gas purification agent inside the hollow portion.

With the above configuration (9), the fluid injection portion is disposed outside the gas purification agent in the hollow portion of the filter element, and thus it is possible to blow off impure substances adhering to the filter element effectively.

(10) In some embodiments, in any one of the above configurations (1) to (9), the gas purification apparatus further includes a downstream separation device for removing the gas purification agent accompanying the flow of the gas discharged outside the housing from the space at the downstream side, the downstream separation device being disposed at a downstream side of the filter portion with respect to the flow of the gas.

In the gas purification apparatus having the above configuration (1), the gas purification agent is disposed at the downstream side of the filter portion, and thus the gas purification agent may accompany the gas flow at the downstream side of the filter portion.

In this regard, with the above configuration (10), the downstream separation device is disposed at the downstream side of the filter portion, and thus it is possible to suppress an outflow of the gas purification agent accompanying the gas flow after passing the filter portion. Thus, it is possible to reduce loss of the gas purification agent.

(11) In some embodiments, in any one of the above configurations (1) to (10), the gas purification agent contains calcium hydroxide.

Calcium hydroxide (slaked lime) has an effect to remove $CO_2$ in a gas as well as a desulfurization effect.

With the above configuration (11), calcium hydroxide is used as the gas purification agent, and thus it is possible to remove $CO_2$ at the same time in addition to sulfur oxide contained in the gas, and thus it is possible to make the facility including the gas purification apparatus more compact.

(12) In some embodiments, in any one of the above configurations (1) to (11), the gas purification apparatus further includes a denitration catalyst supported by a filter element of the filter portion.

With the above configuration (12), the filter element supports the denitration catalyst, and thus it is possible to remove nitrogen oxide in the gas when the gas passes through the filter element. Thus, it is possible to make the facility including the gas purification apparatus more compact.

(13) According to at least one embodiment of the present invention, a ship includes: an engine; and the gas purification apparatus according to any one of the above (1) to (12), and the gas purification apparatus is configured such that exhaust gas from the engine is introduced into the housing of the gas purification apparatus as the gas.

With the above configuration (13), both the filter portion for removing impure substances in the gas and the gas purification agent for removing a removal target substance (sulfur oxide, nitrogen oxide, or carbon dioxide) in the gas are provided in the single housing, and thus it is possible to make the gas purification apparatus more compact. Furthermore, with the above configuration (13), the gas purification agent is disposed, inside the housing, in the downstream space of the filter portion or on the filter portion, and thus it is possible to bring into contact between the gas from which impure substances are removed after passing the filter and the gas purification agent. Accordingly, it is possible to suppress deterioration of the reaction rate due to contamination of the gas purification agent with impure substances. Thus, with the above configuration (13), it is possible to make the apparatus compact, and improve the efficiency of gas purification at the same time.

Furthermore, with the above configuration (13), the gas after removing impure substances or the like with the filter portion is brought into contact with the gas purification agent. Thus, it is possible to retrieve impure substances separated from the gas by the filter portion and the used gas purification agent separately. Thus, it is possible to facilitate reutilization of a used gas purification agent.

(14) According to at least one embodiment of the present invention, a method of purifying a gas includes: a step of introducing a gas into a housing; a step of removing impure substances in the gas from the gas with a filter portion disposed inside the housing; and a step of removing a removal target substance in the gas from the gas with a gas purification agent disposed, inside the housing, on the filter portion or in a space at a downstream side of the filter portion with respect to a flow of the gas.

According to the above method (14), both the filter portion for removing impure substances in the gas and the gas purification agent for removing a removal target substance (e.g. sulfur oxide, nitrogen oxide, or carbon dioxide) in the gas are provided in the single housing, and thus it is possible to make the apparatus for performing the gas purification method more compact. Furthermore, with the above method (14), the gas purification agent is disposed, inside the housing, in the downstream space of the filter portion or on the filter portion, and thus it is possible to bring the gas from which impure substances are removed after passing the filter into contact with the gas purification agent. Accordingly, it is possible to suppress deterioration of the reaction rate due to contamination of the gas purification agent with impure substances. Thus, with the above method (14), it is possible to make the apparatus compact, and improve the efficiency of gas purification at the same time.

Furthermore, according to the above method (14), the gas after removing impure substances or the like with the filter portion is brought into contact with the gas purification agent, and thus it is possible to retrieve impure substances separated from the gas by the filter portion and the used gas purification agent separately. Thus, it is possible to facilitate reutilization of a used gas purification agent.

(15) In some embodiments, the above method (14) further includes a step of removing the gas purification agent accompanying the flow of the gas discharged outside the housing from the space at the downstream side, with a downstream separation device disposed at a downstream side of the filter portion with respect to the flow of the gas.

In the gas purification method (14), the gas purification agent is disposed at the downstream side of the filter portion, and thus the gas purification agent may accompany the gas flow at the downstream side of the filter portion.

In this regard, with the above configuration (15), the downstream separation device is disposed at the downstream side of the filter portion, and thus it is possible to suppress an outflow of the gas purification agent accompanying the gas flow after passing the filter portion. Thus, it is possible to reduce loss of the gas purification agent.

Advantageous Effects

According to at least one embodiment of the present invention, it is possible to provide a gas purification apparatus, a ship including the same, and a gas purification method, capable of making the apparatus compact while improving the efficiency of gas purification.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

Figure 1:
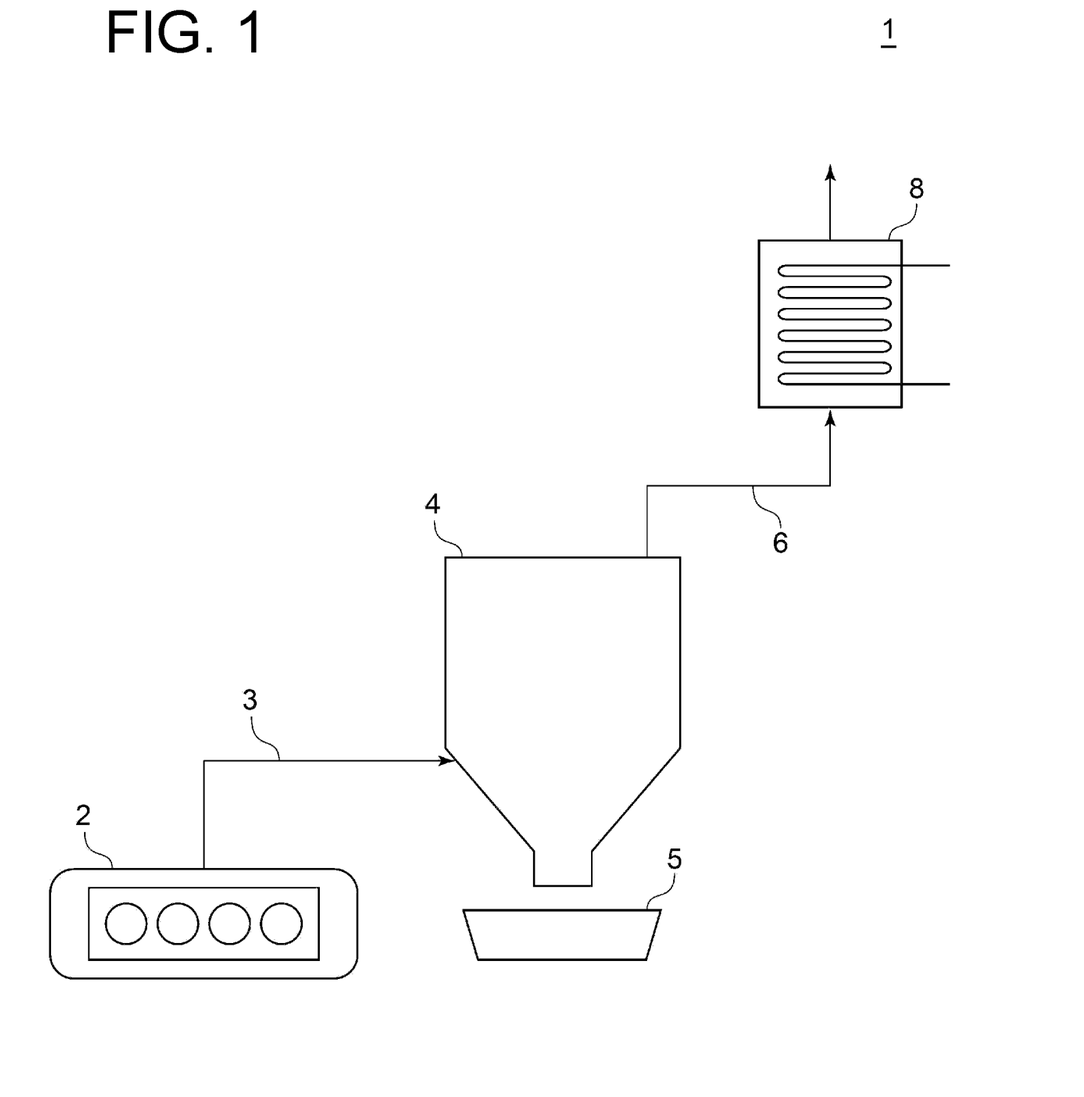
FIG. 1 is a schematic diagram of a facility on a ship equipped with a gas purification apparatus according to an embodiment.

FIG. 1 is a schematic diagram of a facility on a ship 1 equipped with a gas purification apparatus according to an embodiment. As depicted in FIG. 1, the ship 1 includes an engine 2 for generating a propelling force of the ship 1, and a gas purification apparatus 4 for removing sulfur oxide (SOx) from exhaust gas (gas) of the engine 2. The exhaust gas from the engine 2 is introduced into the gas purification apparatus 4 via the first connection pipe 3. The gas purification apparatus 4 will be described later in detail. The gas purification apparatus 4 depicted in FIG. 1 is configured to remove impure substances such as soot dust and oil as well as sulfur oxide contained in the exhaust gas. The impure substances separated from the exhaust gas by the gas purification apparatus 4 is discharged from the gas purification apparatus 4, and stored in a storage part 5. Furthermore, clean exhaust gas after being processed by the gas purification apparatus 4 is discharged to the outside (e.g. atmosphere) via the second connection pipe 6.

The first connection pipe 3 or the second connection pipe 6 may include an exhaust gas processing apparatus other than the gas purification apparatus 4 (e.g. denitration apparatus or $CO_2$ absorption apparatus) or an apparatus that utilizes exhaust gas. For instance, as depicted in FIG. 1, the second connection pipe 6 may include an economizer 8 for recovering heat from exhaust gas.

Next, the gas purification apparatus 4 according to some embodiments will be described in more detail. The gas purification apparatus 4 according to some embodiments may be configured to remove sulfur oxide from exhaust gas from the engine, as depicted in FIG. 1. Furthermore, the gas purification apparatus according to some embodiments may be configured to remove nitrogen oxide from exhaust gas from the engine. Alternatively, the gas purification apparatus according to some embodiments may be configured to remove sulfur oxide or nitrogen oxide from exhaust gas from a combustion facility other than the engine (e.g. boiler or incinerator).

Figure 2:
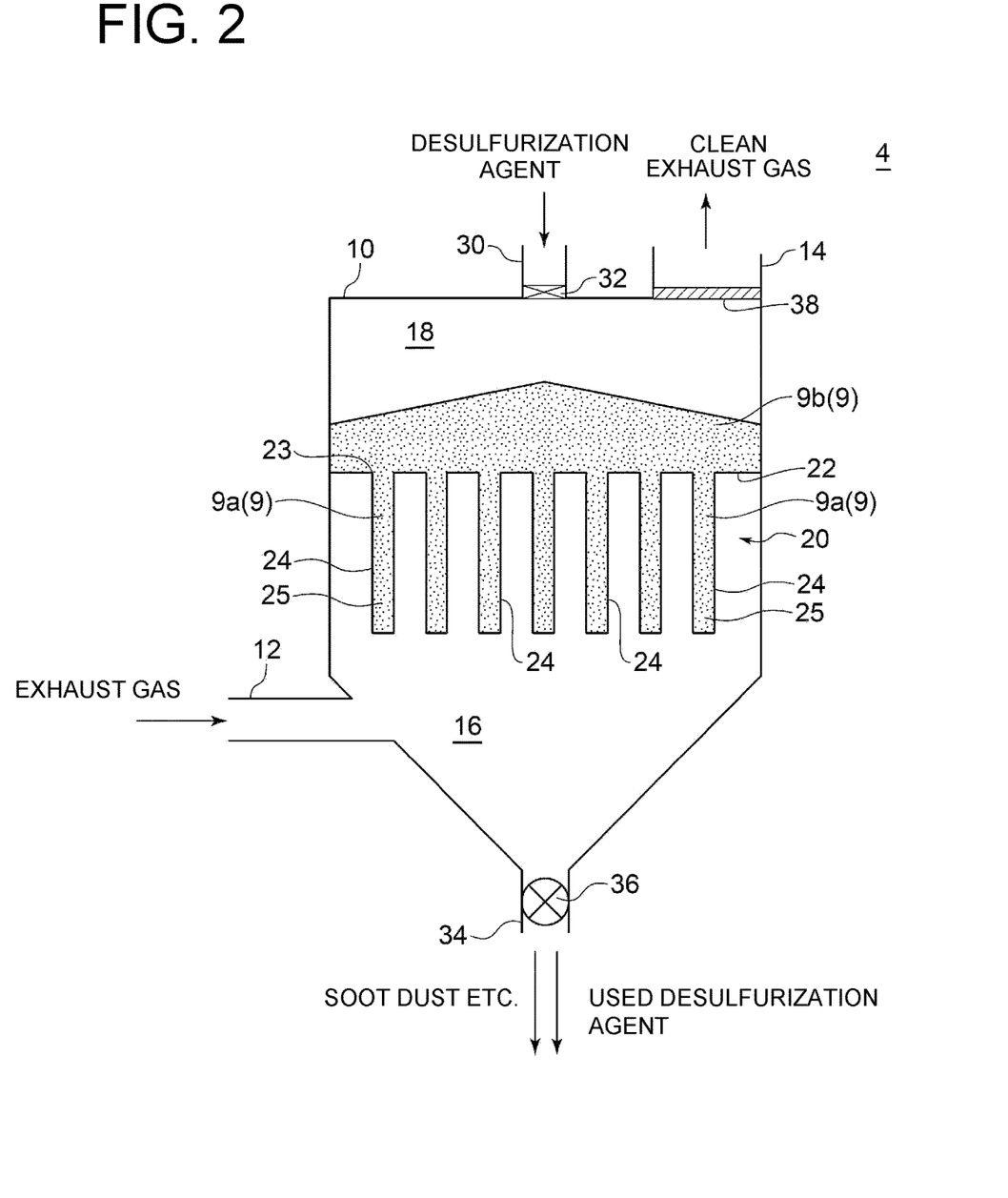
FIG. 2 is a schematic diagram of a gas purification apparatus according to an embodiment.
Figure 3:
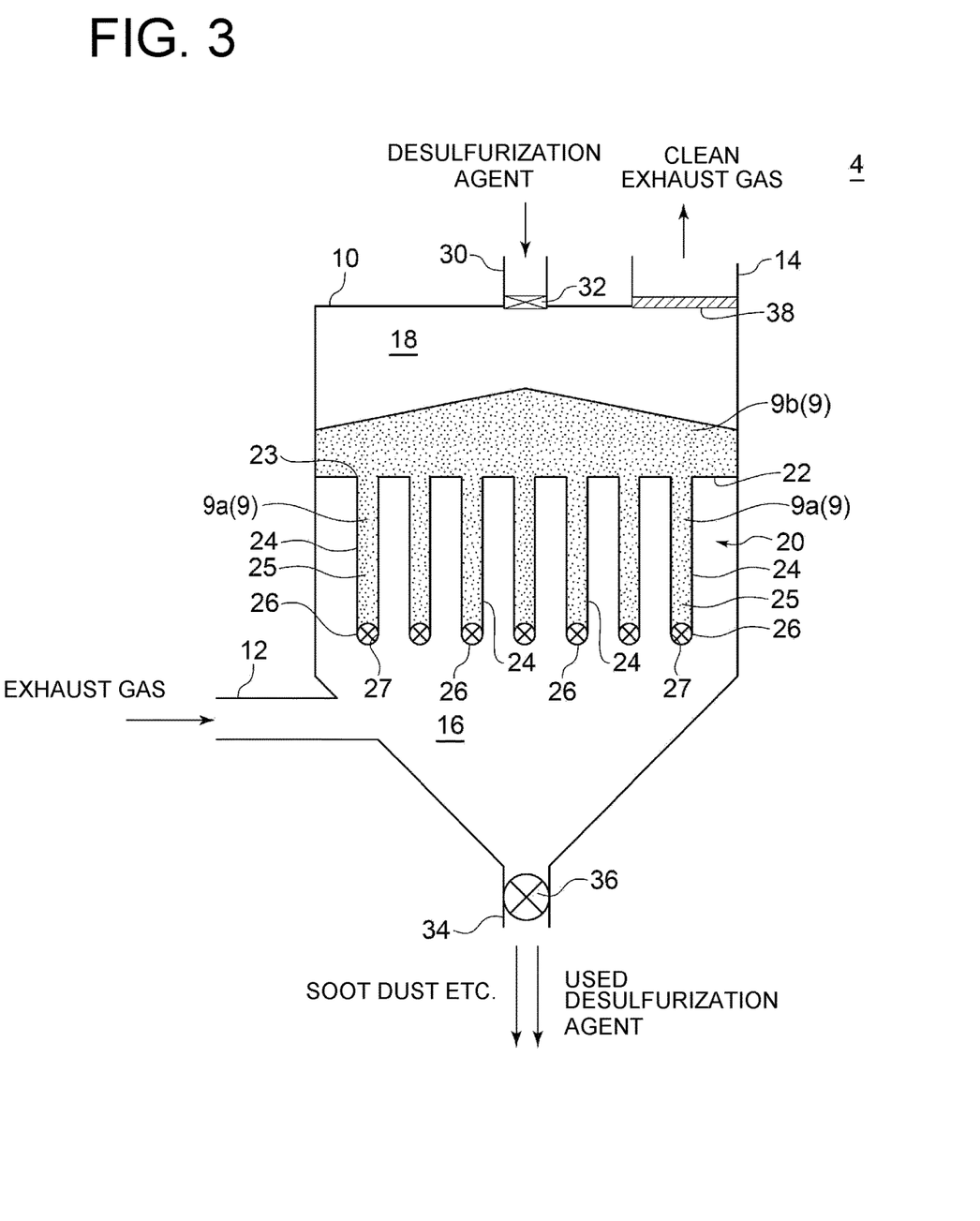
FIG. 3 is a schematic diagram of a gas purification apparatus according to an embodiment.
Figure 4:
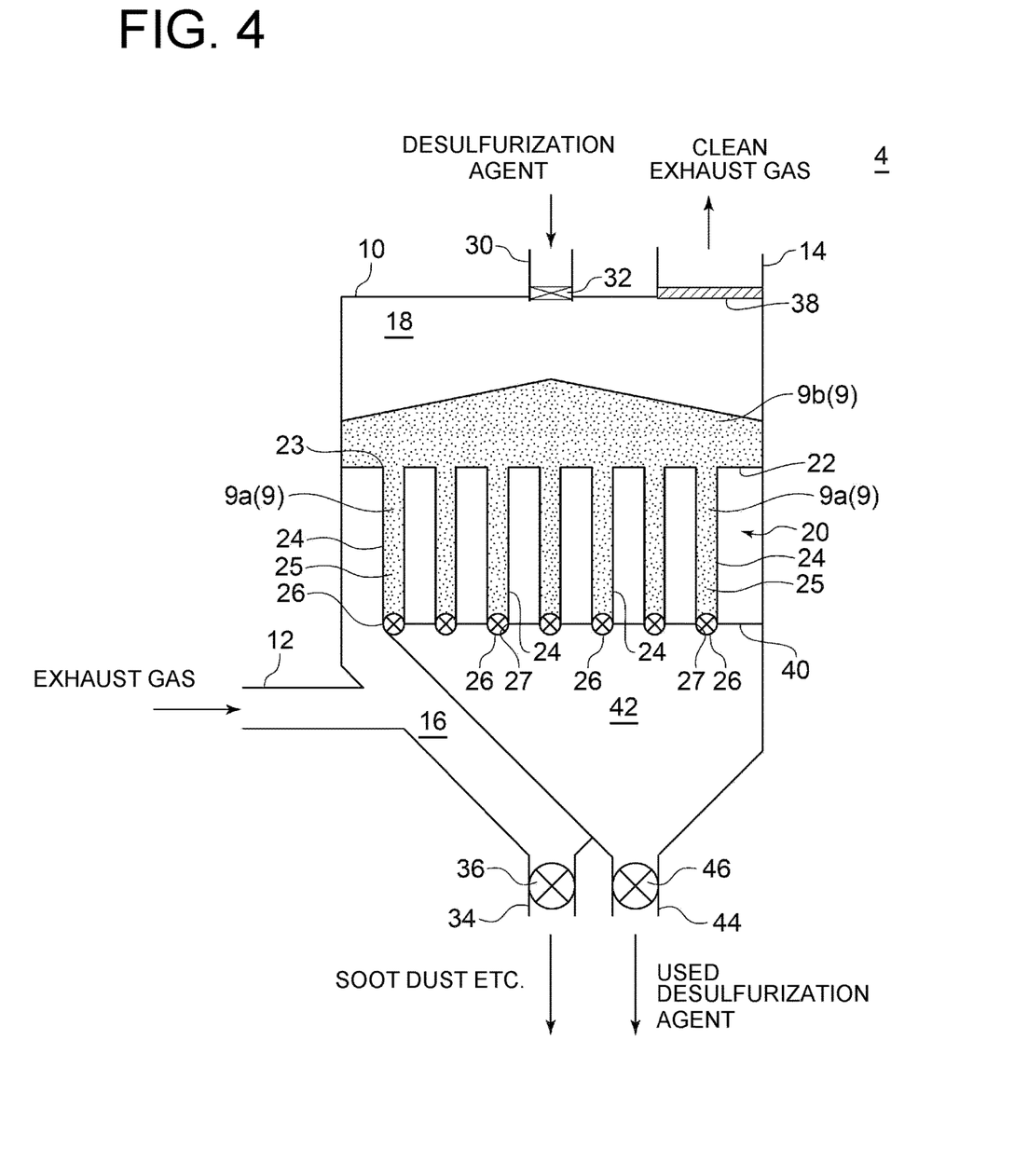
FIG. 4 is a schematic diagram of a gas purification apparatus according to an embodiment.

FIGS. 2 to 4 are each a schematic diagram of a gas purification apparatus 4 according to an embodiment. As depicted in FIGS. 2 to 4, the gas purification apparatus 4 includes a housing 10, and a filter portion 20 disposed inside the housing 10. The filter portion 20 is configured to remove impure substances in exhaust gas such as soot dust and oil. Furthermore, an inlet duct 12 and an outlet duct 14 are connected to the housing 10.

The housing 10 is configured such that exhaust gas from the engine 2 (see FIG. 1) is introduced in to the housing 10 via the inlet duct 12. The exhaust gas introduced from the inlet duct 12 flows through the internal space of the housing 10, and then is discharged to the outside via the outlet duct 14. The inlet duct 12 may constitute a part of the first connection pipe 3 (see FIG. 1), and the outlet duct 14 may constitute a part of the second connection pipe 6.

The internal space of the housing 10 is divided by the filter portion 20 into a space 16 at the upstream side of the filter portion 20 with respect to a flow of exhaust gas (hereinafter, also referred to as merely "upstream space"), and a space 18 at the downstream side of the filter portion 20 with respect to the flow of exhaust gas (hereinafter, referred to as merely "downstream space"). In the downstream space 18, a desulfurization agent 9 (9a, 9b) (gas purification agent) for removing sulfur oxide in exhaust gas is disposed.

A downstream separation device 38 is disposed at the downstream side of the filter portion 20 with respect to the flow of exhaust gas. In the illustrative embodiment depicted in FIGS. 2 to 4, the downstream separation device 38 is disposed between the housing 10 and the outlet duct 14, or on a connection portion between the housing 10 and the outlet duct 14. Furthermore, the downstream separation device 38 is configured to let through a gas, but not the desulfurization agent 9. The downstream separation device 38 may include a filter or a dust collector, for instance.

The housing 10 includes, above the filter portion 20, a desulfurization agent supply pipe 30 and a supply valve 32 for supplying the desulfurization agent 9 into the housing.

Furthermore, the housing 10 includes, below the filter portion 20, a discharge pipe 34 and a discharge valve 36 for discharging impure substances such as soot dust and oil separated from the exhaust gas by the filter portion 20. Furthermore, while the discharge valve 36 is configured to open when discharging impure substances such as soot dust and oil separated by the filter portion 20 outside the apparatus, the discharge valve 36 is normally closed so that exhaust gas flowing into the housing 10 does not leak out from the discharge pipe 34.

In some embodiments, the filter portion 20 includes a filter element 24 for removing impure substances such as soot dust and oil in the exhaust gas, and a support plate 22 (support portion) for supporting the filter element 24. The filter element 24 has a hollow portion 25, and is disposed so as to protrude from the downstream space 18 toward the upstream space 16. Further, the desulfurization agent 9a is disposed in the hollow portion 25 of the filter element 24.

In the illustrative embodiment depicted in FIGS. 2 to 4, the filter element 24 has a tubular shape. Furthermore, the support plate 22 is disposed so as to spread along the horizontal direction, and has an opening 23 that has substantially the same diameter as the tubular shape of the filter element 24. The upper end portion of the filter element 24 having a tubular shape is attached to the opening 23 of the support plate 22. The filter element 24 extends downward from the support plate 22. The filter portion 20 may have the support plate 22 having a plurality of openings 23, and a plurality of filter elements 24.

As depicted in FIGS. 2 to 4, the support plate 22 is configured to store the backup desulfurization agent 9b above the desulfurization agent 9a disposed in the hollow portion 25 of the filter element 24.

The filter element 24 is characterized in that the material and coarseness of the filter element 24 are configured so as to let a gas through but block impure substances such as soot dust and oil contained in exhaust gas.

The filter element 24 may be formed by using a fiber product such as fabric (e.g. fabric filter) or formed by using porous ceramics (ceramics filter).

The desulfurization agent 9 may be powder or particulate matter.

As the desulfurization agent 9, for instance, slaked lime (calcium hydroxide; Ca $(OH)_2$), activated coal, or sodium bicarbonate ($Na_2HCO_3$) may be used.

In a case where slaked lime is used, when the slaked lime makes contact with sulfur oxide (SOx) in exhaust gas, a chemical reaction occurs and produces calcium sulfite ($CaSO_3$; solid), calcium sulfate ($CaSO_4$; solid), and water ($H_2O$). Furthermore, in a case where activated coal is used, when the activated coal makes contact with sulfur oxide (SOx) in exhaust gas, the sulfur oxide is adsorbed by the activated coal. Accordingly, through fixation of sulfur oxide in the exhaust gas to the desulfurization agent, sulfur oxide is removed from exhaust gas (desulfurization).

Further, the desulfurization agent 9 may be disposed on the outer surface or the inner surface of the filter element 24. In this case, to be used as the filter element 24, a desulfurization agent may be mixed into a material (e.g. fiber product), or the desulfurization agent 9 may be supported on the surface (outer surface or inner surface) of the filter element 24 formed from a material by a methodology such as impregnation.

Next, the procedure of desulfurization of exhaust gas from the engine 2 (see FIG. 1) using the gas purification apparatus 4 having the above described configuration will be described.

First, exhaust gas is introduced into the housing 10 via the inlet duct 12. Accordingly, exhaust gas passes through the filter element 24 of the filter portion 20 from the upstream space 16, and then flows into the hollow portion 25 of the filter element 24 (downstream space 18).

When the exhaust gas passes through the filter element 24, impure substances such as soot dust and oil contained in the exhaust gas are not able to pass through the filter element 24, and thereby impure substances such as soot dust and oil are removed from exhaust gas. The impure substances removed from the exhaust gas are collected on the upstream surface of the filter element 24, and accumulate with time.

The exhaust gas from which impure substances have been removed by the filter element 24 flows into the hollow portion 25 of the filter element 24. In the hollow portion 25, the desulfurization agent 9a disposed in the hollow portion 25 and exhaust gas make contact, and the sulfur oxide contained in exhaust gas is removed from exhaust gas due to reaction with the desulfurization agent 9a.

Further, as depicted in FIGS. 2 to 4, in a case where the desulfurization agent 9b is additionally stored above the desulfurization agent 9a, exhaust gas flowing toward the outlet duct 14 from the hollow portion 25 also makes contact with the desulfurization agent 9b. Thus, it is possible to improve the desulfurization performance of the gas purification apparatus 4, and remove sulfur oxide in the exhaust gas more reliably.

Accordingly, with the filter element 24 and the desulfurization agents 9 (9a, 9b), impure substances such as soot dust and oil and sulfur oxide are removed from the exhaust gas, and the clean exhaust gas flows into the outlet duct 14. At this time, the clean exhaust gas passes through the downstream separation device 38 disposed at the downstream side of the filter portion 20. At the downstream separation device 38, the desulfurization agent 9 accompanying the flow of exhaust gas flowing toward the outlet duct 14 from the downstream space 18 is removed.

The clean exhaust gas after passing through the downstream separation device 38 is discharged outside the housing 10 via the outlet duct 14.

Furthermore, impure substances such as soot dust and oil collected and accumulated on the upstream surface of the filter element 24 may be detached from the surface of the filter element 24 by operating the filter cleaning portion 50 (see FIGS. 5 and 6, for instance) described below, for instance. Furthermore, the impure substances may be discharged outside the gas purification apparatus 4 from the discharge pipe 34 disposed below the filter portion 20.

Furthermore, the consumed and used desulfurization agent 9 may be discharged from the hollow portion 25 of the filter element 24 via the discharge port 27 (see FIGS. 3 and 4) described below, for instance.

With the gas purification apparatus 4 according to the above embodiment, both the filter portion 20 for removing impure substances (e.g. soot dust) in exhaust gas and the desulfurization agent 9 (gas purification agent) for removing sulfur oxide in exhaust gas are provided in the single housing 10, and thus it is possible to make the gas purification apparatus 4 more compact.

Furthermore, with the gas purification apparatus 4 according to the above described embodiment, the desulfurization agent 9 is disposed in the downstream space 18 of the filter portion 20 inside the housing 10, and thus it is possible to bring into contact the exhaust gas from which impure substances (e.g. soot dust) are removed and the desulfurization agent 9. Accordingly, it is possible to suppress deterioration of the reaction rate due to contamination of the desulfurization agent 9 with impure substances. Thus, with the gas purification apparatus 4 according to the above embodiment, it is possible to make the apparatus compact while improving the efficiency of desulfurization (gas purification).

Furthermore, with the gas purification apparatus 4 according to the above embodiment, the exhaust gas after removing impure substances with the filter portion 20 is brought into contact with the desulfurization agent 9, and thus it is possible to retrieve the used desulfurization agent and impure substances separated from exhaust gas by the filter portion 20 separately. Thus, it is possible to facilitate reutilization of the used desulfurization agent (gas purification agent) (e.g. regeneration of the desulfurization agent, or reuse as a material in another industry).

In some embodiments, the filter element 24 may include a discharge port 27 for discharging the desulfurization agent 9 from the hollow portion 25 of the filter element 24. Furthermore, the filter element 24 may have an opening-and-closing portion 26 configured to open and close the discharge port 27.

In the illustrative embodiment depicted in FIGS. 3 and 4, the discharge port 27 is disposed on the lower end portion of the filter element 24 extending in the up-down direction in a tubular shape, and the opening-and-closing portion 26 capable of opening and closing the discharge port 27 is provided. The opening-and-closing portion 26 may include a rotary valve, for instance.

As described above, it is possible to discharge the desulfurization agent 9 from the hollow portion 25 via the discharge port 27 disposed in the filter element 24, and thus it is possible to discharge the desulfurization agent 9 easily via the discharge port 27. Furthermore, it is possible to supply and replace the desulfurization agent 9 easily.

Furthermore, with the discharge port 27 being disposed on the lower end portion of the filter element 24, the desulfurization agent 9 inside the hollow portion 25 falls under its own weight. Accordingly, it is possible to improve the desulfurization performance of the desulfurization agent 9, and discharge the desulfurization agent 9 from the hollow portion 25 even more easily.

Furthermore, in a case where the backup desulfurization agent 9 is disposed above the hollow portion 25, when the desulfurization agent disposed in the hollow portion 25 of the filter element 24 is consumed and used, it is possible to easily replace the used desulfurization agent with the desulfurization agent 9b disposed above, by discharging the used desulfurization agent from the hollow portion 25 via the discharge port 27. Thus, it is possible to operate the gas purification apparatus 4 more efficiently.

Furthermore, by providing the opening-and-closing portion 26 capable of opening and closing the discharge port 27 as in the above described embodiment, it is possible to discharge the desulfurization agent 9 from the hollow portion 25 at a desired timing. For instance, by opening the opening-and-closing portion 26 at the timing when the desulfurization agent 9 disposed in the hollow portion 25 is used up, it is possible to discharge only the used desulfurization agent 9 from the hollow portion 25. Thus, it is possible to operate the gas purification apparatus 4 more efficiently.

Furthermore, in a case where slaked lime (calcium hydroxide; $Ca(OH)_2$) is used as the desulfurization agent, the used desulfurization agent after completing reaction with the sulfur oxide is calcium sulfite ($CaSO_3$) or calcium sulfate ($CaSO_4$).

In some embodiments, as depicted in FIG. 4 for instance, the gas purification apparatus 4 includes a discharge chamber 42 for discharging the desulfurization agent 9 from the hollow portion 25, and the discharge chamber 42 is separated from the upstream space 16.

In the embodiment depicted in FIG. 4, in the internal space of the housing 10, the discharge chamber 42 and the upstream space 16 are separated by a separation plate 40 that extends in the horizontal direction in the vicinity of the lower end portion of the filter element 24 extending in the up-down direction.

As depicted in FIG. 4, the discharge chamber 42 may be formed at least partially by the housing 10.

Furthermore, in the embodiment depicted in FIG. 4, below the discharge chamber 42, a discharge pipe 44 for discharging the used desulfurization agent 9 to the outside of the gas purification apparatus 4, and a discharge valve 46 for switching the discharge state of the used desulfurization agent 9 from the discharge pipe 44 are provided.

Accordingly, by separating the upstream space 16 where impure substances such as soot dust and oil separated from the exhaust gas in the filter portion 20 remain and the discharge chamber 42 being a space through which the used desulfurization agent 9 is discharged from the hollow portion 25, it is possible to suppress contamination of the discharged desulfurization agent 9 with impure substances such as soot dust and oil. Therefore, it is possible to retrieve the used desulfurization agent in a relatively high purity, and thus it is possible to reuse the used desulfurization agent.

Figure 5:
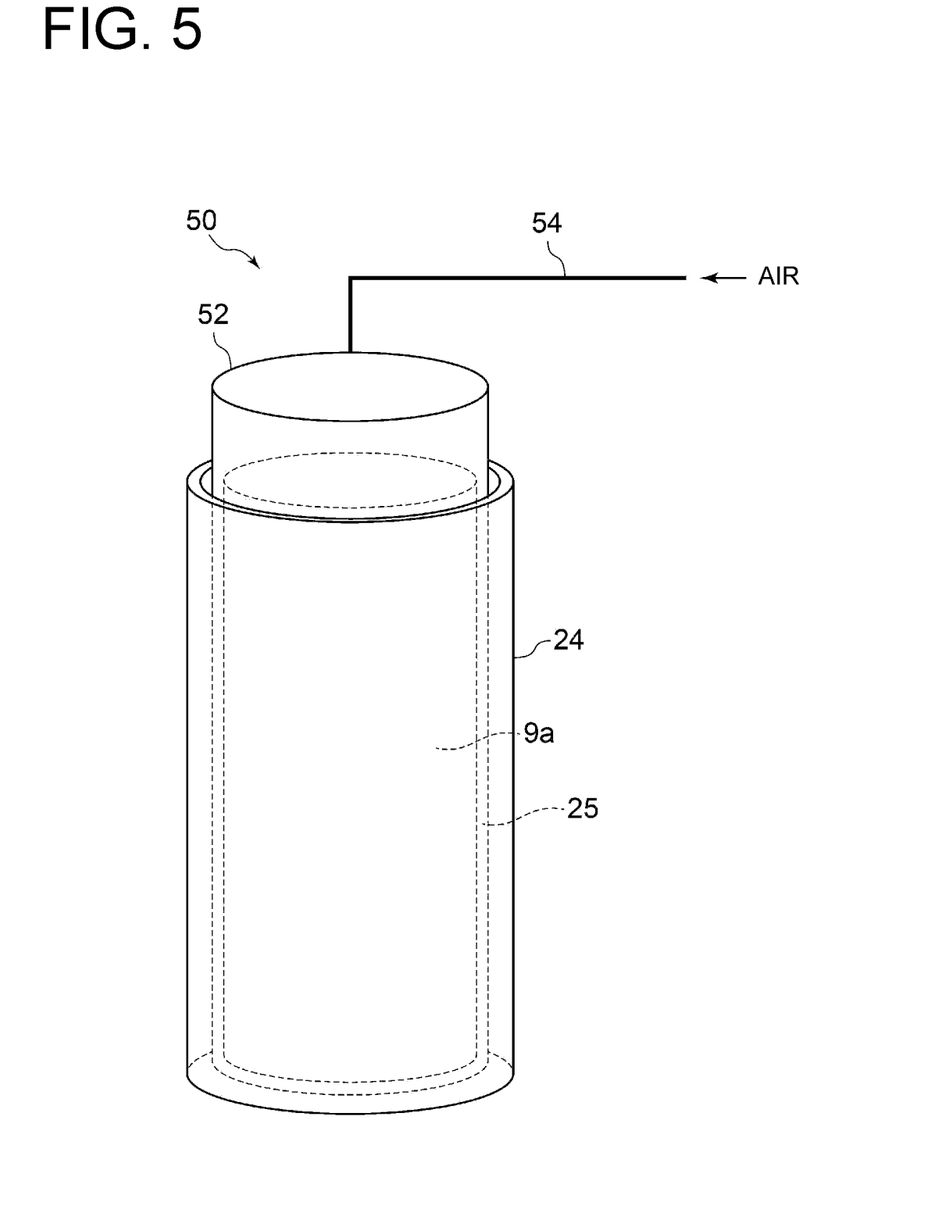
FIG. 5 is a schematic configuration diagram of a filter element and a filter cleaning portion according to an embodiment.
Figure 6:
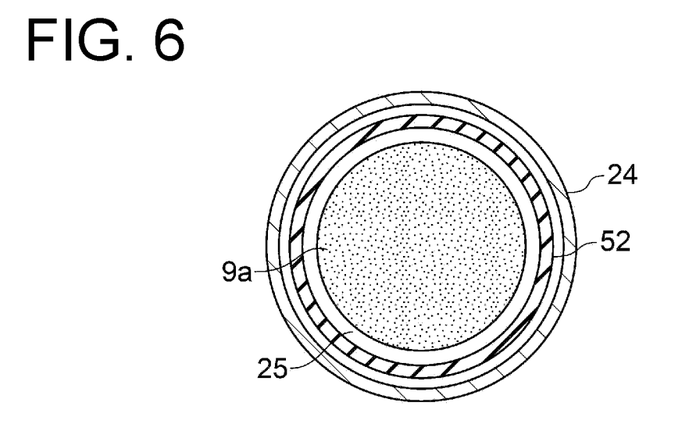
FIG. 6 is a schematic cross-sectional diagram of the filter element and the filter cleaning portion depicted in FIG. 5.

FIG. 5 is a schematic configuration diagram of a filter element 24 and a filter cleaning portion 50 according to an embodiment. FIG. 6 is a schematic cross-sectional diagram of the filter element 24 and the filter cleaning portion 50 depicted in FIG. 5.

In some embodiments, the gas purification apparatus 4 (see FIGS. 2 to 4) may further include a filter cleaning portion 50 configured to blow a fluid (e.g. a gas like air) toward the filter element 24.

The filter cleaning portion 50 may be configured to blow a fluid toward the filter element 24 from the outer side of the filter element 24, or may be configured to blow a fluid toward the filter element 24 from the inside of the filter element 24 (e.g. from the hollow portion of the filter element 24).

In the illustrative embodiment depicted in FIGS. 5 and 6, the filter cleaning portion 50 includes a gas injection portion 52 (fluid injection portion) disposed at the outer side of the desulfurization agent 9 in the hollow portion 25 of the filter element 24, and a gas supply portion 54 (e.g. tube) for supplying a gas toward the gas injection portion 52.

In an embodiment, as depicted in FIGS. 5 and 6, the gas injection portion 52 may be a porous sheet.

Alternatively, in an embodiment, the gas injection portion 52 may be a tube that extends along the longitudinal direction or the circumferential direction of the filter element 24 and that has gas injection holes.

The gas injection portion 52 may inject a gas toward the inside of the filter element 24, or toward the outside of the filter element 24.

As described above, with the filter cleaning portion 50 capable of blowing a gas toward the filter element 24, it is possible to blow off impure substances such as soot dust and oil adhering to the filter element 24, and remove the the impure substances from the filter element 24. Thus, it is possible to suppress accumulation of impure substances on the filter element 24 and reduce pressure loss, thereby performing desulfurization more efficiently.

Although not depicted, in some embodiments, a pre-coating portion that covers the filter element 24 may be provided. The pre-coating portion may be formed by blowing a soot removal agent or an oil removal agent (e.g. talc) on the upstream surface of the filter element 24. As described above, with the pre-coating portion, impure substances such as soot dust and oil adhere to the pre-coating portion, and thus it is possible to suppress clogging or adherence of impure substances to the filter element 24, and carry out gas purification efficiently. Furthermore, it is possible to clean the filter element 24 with the filter cleaning portion 50 efficiently.

In some embodiments, the gas purification apparatus 4 further includes a denitration catalyst supported by the filter element 24 of the filter portion 20.

To produce the filter element 24 supporting a denitration catalyst, for instance, the filter element 24 may by produced by using a fabric woven with fibers mixed with a denitration catalyst, or by impregnating a fabric with a liquid containing a denitration catalyst and drying the liquid.

Furthermore, a microporous ceramics filter supporting a catalyst may be used as the filter element 24.

As described above, with the filter element 24 supporting the denitration catalyst, it is possible to remove nitrogen oxide in the exhaust gas when the exhaust gas passes through the filter element 24. Thus, it is possible to make the facility including the gas purification apparatus 4 more compact.

In some embodiments, the desulfurization agent 9 contains slaked lime (calcium hydroxide; $Ca(OH)_2$).

In this case, calcium hydroxide (slaked lime) has an effect to remove $CO_2$ in a gas as well as a desulfurization effect, and thus it is possible to remove $CO_2$ at the same time in addition to sulfur oxide contained in the exhaust gas. Thus, it is possible to make the facility including the gas purification apparatus 4 more compact.

The gas purification apparatus 4 according to some embodiments may be configured to remove nitrogen oxide and/or carbon dioxide from exhaust gas from the engine. In this case, as the gas purification agent disposed in the housing 10, a nitrogen-oxide removal agent and/or a carbon-dioxide removal agent may be used instead of the above described desulfurization agent 9, or a nitrogen-oxide removal agent and/or a carbon-dioxide removal agent may be used together with the desulfurization agent 9.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

REFERENCE SIGNS LIST

1 Ship
2 Engine
3 First connection pipe
4 Gas purification apparatus
5 Storage part
6 Second connection pipe
8 Economizer
9, 9a, 9b Desulfurization agent
10 Housing
12 Inlet duct
14 Outlet duct
16 Upstream space
18 Downstream space
20 Filter portion
22 Support plate
23 Opening
24 Filter element
25 Hollow portion
26 Opening-and-closing portion
27 Discharge port
30 Desulfurization agent supply pipe
32 Supply valve
34 Discharge pipe
36 Discharge valve
38 Downstream separation device
40 Separation plate
42 Discharge chamber
44 Discharge pipe
46 Discharge valve
50 Filter cleaning portion
52 Gas injection portion
54 Gas supply portion

The invention claimed is:

1. A gas purification apparatus, comprising:
a housing to which a gas is introduced;
a filter portion that removes an impure substance from the gas, the filter portion being disposed inside the housing; and
a gas purification agent that removes a removal target substance in the gas from the gas, the gas purification agent being disposed inside the housing on the filter portion or in a space at a downstream side of the filter portion with respect to a flow of the gas, wherein
the filter portion includes a filter element having a hollow portion, the filter element being disposed to protrude from the space at the downstream side toward a space at an upstream side of the filter portion with respect to the flow of the gas,
the gas purification agent is disposed at least in the filter element or in the hollow portion of the filter element,
the filter portion further includes a support portion for supporting the filter element,
the filter element protrudes downward from the support portion, and
the support portion stores a backup gas purification agent above the gas purification agent.

2. The gas purification apparatus according to claim 1, wherein the filter element includes a tubular filter element.

3. The gas purification apparatus according to claim 1, further comprising a filter cleaning portion that blows a fluid toward the filter element, or a pre-coating portion covering the filter element.

4. The gas purification apparatus according to claim 3, wherein
the gas purification apparatus comprises the filter cleaning portion, and
the filter cleaning portion includes a gas injection portion disposed outside the gas purification agent inside the hollow portion.

5. The gas purification apparatus according to claim 1, further comprising a downstream separation device for removing the gas purification agent accompanying the flow of the gas discharged outside the housing from the space at the downstream side, the downstream separation device being disposed at a downstream side of the filter portion with respect to the flow of the gas.

6. The gas purification apparatus according to claim 1, wherein the gas purification agent contains calcium hydroxide.

7. The gas purification apparatus according to claim 1, further comprising a denitration catalyst supported by a filter element of the filter portion.

8. A gas purification apparatus, comprising:
a housing to which a gas is introduced;
a filter portion that removes an impure substance from the gas, the filter portion being disposed inside the housing; and
a gas purification agent that removes a removal target substance in the gas from the gas, the gas purification agent being disposed inside the housing on the filter portion or in a space at a downstream side of the filter portion with respect to a flow of the gas, wherein
the filter portion includes a filter element having a hollow portion, the filter element being disposed to protrude from the space at the downstream side toward a space at an upstream side of the filter portion with respect to the flow of the gas,
the gas purification agent is disposed at least in the filter element or in the hollow portion of the filter element, and
the gas purification apparatus further comprises a discharge port that discharges the gas purification agent from the hollow portion of the filter element, the discharge port being disposed on the filter element.

9. The gas purification apparatus according to claim 8, further comprising an opening-and-closing portion that opens and closes the discharge port.

10. The gas purification apparatus according to claim 8, further comprising a discharge chamber through which the gas purification agent is to be discharged from the hollow portion,
wherein the discharge chamber and the space at the upstream side are separated.

11. A ship, comprising:
an engine; and
a gas purification apparatus, wherein
the gas purification apparatus comprises:
a housing to which a gas is introduced;
a filter portion that removes an impure substance from the gas, the filter portion being disposed inside the housing; and
a gas purification agent that removes a removal target substance in the gas from the gas, the gas purification agent being disposed, inside the housing, on the filter portion or in a space at a downstream side of the filter portion with respect to a flow of the gas, and the gas purification apparatus is configured such that exhaust gas from the engine is introduced into the housing of the gas purification apparatus as the gas.

12. A method of purifying a gas by using the gas purification apparatus according to claim 1, comprising:

introducing a gas into the housing;

removing impure substances in the gas from the gas with the filter portion disposed inside the housing; and removing a removal target substance in the gas from the gas with the gas purification agent disposed, inside the housing, on the filter portion or in a space at a downstream side of the filter portion with respect to a flow of the gas.

13. The method of purifying a gas according to claim 12, further comprising:

removing the gas purification agent accompanying the flow of the gas discharged outside the housing from the space at the downstream side, with a downstream separation device disposed at a downstream side of the filter portion with respect to the flow of the gas.

\* \* \* \* \*